(12) United States Patent
Magri et al.

(10) Patent No.: US 8,824,886 B2
(45) Date of Patent: Sep. 2, 2014

(54) OPTICAL SIGNAL MONITORING METHOD AND APPARATUS

(75) Inventors: Roberto Magri, Parma (IT); Raffaele Corsini, Milan (IT); Ernesto Ciaramella, Rome (IT); Emma Matarazzo, Avellion (IT); Andrea Peracchi, Salsomaggiore Terme (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 402 days.

(21) Appl. No.: 13/253,016

(22) Filed: Oct. 4, 2011

(65) Prior Publication Data
US 2013/0051793 A1 Feb. 28, 2013

(30) Foreign Application Priority Data

Aug. 30, 2011 (EP) .................................... 11179303

(51) Int. Cl.
*H04B 10/08* (2006.01)
*H04B 17/00* (2006.01)
*H04B 10/00* (2013.01)

(52) U.S. Cl.
USPC ......... 398/25; 398/9; 398/29; 398/11; 398/34

(58) Field of Classification Search
CPC .................. H04B 10/07955; H04B 10/07951; H04B 10/2569; H04J 14/0227
USPC ...................................................... 398/9, 25
See application file for complete search history.

(56) References Cited

U.S. PATENT DOCUMENTS

| | | | |
|---|---|---|---|
| 6,559,991 B1 * | 5/2003 | Farley et al. .................. | 398/152 |
| 6,996,297 B2 * | 2/2006 | Krause et al. ................... | 385/11 |
| 8,452,174 B2 * | 5/2013 | Xia et al. .......................... | 398/29 |
| 2003/0174337 A1 * | 9/2003 | VanWiggeren ................ | 356/477 |
| 2003/0202798 A1 * | 10/2003 | Chou et al. ..................... | 398/159 |
| 2008/0037925 A1 | 2/2008 | Sasaoka et al. | |
| 2008/0080805 A1 * | 4/2008 | Nakashima et al. ............ | 385/11 |
| 2009/0073560 A1 * | 3/2009 | Granot et al. .................. | 359/495 |

(Continued)

FOREIGN PATENT DOCUMENTS

GB 2470963 A 12/2010

OTHER PUBLICATIONS

Extended European Search Report, Application No. EP11179303.0, dated May 16, 2012, 8 pages.

(Continued)

*Primary Examiner* — Oommen Jacob
(74) *Attorney, Agent, or Firm* — Blakely Sokoloff Taylor Zafman LLP

(57) ABSTRACT

A method of monitoring a differential group delay (DGD) of an optical communications signal having a polarisation multiplexed modulation format is described. The method includes the operations of receiving a signal and performing analogue to digital conversion of the signal to generate a digitised signal corresponding to one polarisation of the signal and to generate another digitised signal corresponding to another polarisation of the signal, and applying a polarisation mode dispersion(PMD) compensation to each of the digitised signals. The method further includes the operations of obtaining an indication of the channel transfer function of the optical communications signal, determining a DGD in dependence on the indication of the channel transfer function, determining a delay between the PMD compensated digitised signals, subtracting the delay from the DGD to obtain a corrected DGD, and generating and transmitting a monitoring signal with an indication of the corrected DGD.

24 Claims, 10 Drawing Sheets

(56) References Cited

U.S. PATENT DOCUMENTS

| | | | | |
|---|---|---|---|---|
| 2009/0073561 | A1* | 3/2009 | Granot et al. | 359/495 |
| 2010/0007952 | A1* | 1/2010 | Krummrich | 359/484 |
| 2010/0073667 | A1* | 3/2010 | Cyr et al. | 356/73.1 |
| 2010/0111530 | A1* | 5/2010 | Shen et al. | 398/65 |
| 2011/0142445 | A1* | 6/2011 | Granot et al. | 398/34 |
| 2012/0121254 | A1* | 5/2012 | Ellison et al. | 398/29 |

OTHER PUBLICATIONS

S. L. Woodward et al., "A Shared PMD and Chromatic Dispersion Monitor Based on a Coherent Receiver," May 15, 2010, 3 pages, IEEE Photonics Technology Letters, vol. 22, No. 10.

J. C. Geyer et al., "Optical Performance Monitoring using a 4Gb/s Realtime Coherent Receiver (Invited)," 2009, 2 pages, IEEE.

Fabian N. Hauske et al., "Optical Performance Monitoring in Digital Coherent Receivers," Aug. 15, 2009, 9 pages, Journal of Lightwave Technology, vol. 27, No. 16, IEEE.

Fred Buchali et al., "Adaptive PMD Compensation by Electrical and Optical Techniques," Apr. 2004, 11 pages, Journal of Lightwave Technology, vol. 22, No. 4, IEEE.

"Interfaces for the optical transport network", Recommendation ITU-T G.709/Y.1331, (Feb. 2012), 238 pages.

Colavolpe, Giulio, et al., "Robust Multilevel Coherent Optical Systems With Linear Processing at the Receiver", *Journal of Lightwave Technology*, vol. 27, No. 13, IEEE, (Jul. 1, 2009), 13 pages.

Ip, Ezra M., et al., "Fiber Impairment Compensation Using Coherent Detection and Digital Signal Processing", *Journal of Lightwave Technology*, IEEE, (Feb. 3, 2010), 18 pages.

* cited by examiner

OPTICAL SIGNAL MONITORING METHOD AND APPARATUS

CROSS-REFERENCE TO RELATED APPLICATIONS

This application claims the benefit of European Application No. 11179303.0, filed Aug. 30, 2011, which is hereby incorporated by reference.

TECHNICAL FIELD

The invention relates to a method of monitoring a differential group delay of an optical communications signal having a polarisation multiplexed modulation format, optical signal monitoring apparatus and a communications network node.

BACKGROUND

The introduction of digital signal processing for electronic signal equalization following signal detection using digital coherent receivers has allowed the main fibre transmission impairments, like chromatic dispersion, CD, and polarization mode dispersion, PMD, to be compensated in the electronic domain rather than with optical devices. A digital signal processor comprising a digital equalizer arranged to perform as a two-dimensional match filter is able to compensate for both CD and PMD, to recover a signal following propagation across an optical link. The digital equalizer operates to automatically tend to take the form of the inverse of the channel linear transfer function of the received signal. As reported by Hauske et al, "Optical performance monitoring in digital coherent receivers", J. Lightwave Technol., vol. 27, no. 16, 2009, pages 3623-3631, the concept of optical performance monitoring by estimating deterministic linear channel distortions like residual CD, PMD, and polarization dependent loss, PDL, by analyzing the finite impulse response of the digital equalizer has been shown in theory and by simulation. However, Hauske et al also report that although the theory of the linear optical channel model enables all the desired optical parameters to be monitored, there remain problems with the practical implementation of the estimation algorithms that are used.

SUMMARY

It is an object to provide an improved method of monitoring a differential group delay of an optical communications signal having a polarisation multiplexed modulation format. It is a further object to provide an improved optical signal monitoring apparatus. It is a further object to provide an improved communications network node.

A first aspect of the invention provides a method of monitoring a differential group delay of an optical communications signal having a polarisation multiplexed modulation format. The method comprises receiving a said signal and performing analogue to digital conversion of the signal to generate a first digitised signal corresponding to a first polarisation of the signal and to generate a second digitised signal corresponding to a second polarisation of the signal. The method comprises applying a polarisation mode dispersion compensation to each of the digitised signals. The method comprises obtaining an indication of the channel transfer function of the optical communications signal. The method comprises determining a differential group delay in dependence on the indication of the channel transfer function. The method comprises determining a delay between the polarisation mode dispersion compensated first digitised signal and the polarisation mode dispersion compensated second digitised signal. The method comprises subtracting the delay from the differential group delay to obtain a corrected differential group delay. The method comprises generating and transmitting a monitoring signal comprising an indication of the corrected differential group delay.

The method may enable improved monitoring of differential group delay, DGD, of an optical communications signal having a polarisation multiplexed modulation format. The method may also enable cost efficient, robust and accurate in-service monitoring of DGD. The method may therefore enable improved trouble-shooting of communications traffic problems or faults, improved monitoring of cable ageing and margins, and improved fault prevention. The method may also enable improved signal quality monitoring and may allow for service quality differentiation. The method may be used to enhance control plane functionalities related to DGD monitoring in an optical communications network, such as a wavelength switch optical network, WSON. This may enable provision of a reliable and real-time updated network status database, enabling impairment aware routing and on the fly protection switching in a WSON. Improved monitoring of DGD may enable optimisation of communications traffic paths in legacy 10G and 40G channels based on non-coherent technology. Improved monitoring of DGD may also enable improved network planning and upgrading using real measured DGD values. The method may enable fibre ageing monitoring to be performed by monitoring the DGD, and thus the PMD, of optical signals transmitted across a fibre. The method may enable PMD-sensitive communications traffic to be transmitted across an optical communications network.

In an embodiment, the first and second digitised signals are received at a digital signal processor comprising a two-dimensional matched filter. The indication of the channel transfer function is obtained from the two-dimensional matched filter. The method may enable DGD monitoring without decreasing the signal power and without requiring the provision of additional monitoring equipment.

In an embodiment, the two-dimensional matched filter comprises a plurality of taps. The indication of the channel transfer function comprises an output of each of the taps.

In an embodiment, the two-dimensional matched filter comprises at least five taps. This may enable the compensated DGD to be accurate to within ten percent of the actual DGD experienced by the optical communications signal.

In an embodiment, the two-dimensional matched filter comprises at least eleven taps. This may enable the compensated DGD to be accurate to within one percent of the actual DGD experienced by the optical communications signal.

In an embodiment, the two-dimensional matched filter is an adaptive two-dimensional fractionally spaced feed forward equaliser and each tap has a tap coefficient. The method comprises applying a minimum mean square error, MMSE, criterion to adjust the tap coefficients to cause the feed forward equaliser to operate as a two-dimensional matched filter. The may enable a DGD value to be obtained by analysing the configuration of the equaliser following adaption of the equaliser to the signal.

In an embodiment, the method comprises adaptively adjusting the tap coefficients to cause each tap to have a respective output having a steady-state value and the method comprises extracting the steady-state value of each tap.

In an embodiment, the polarisation mode dispersion compensated first and second digitised signals are received at a synchroniser arranged to synchronise the signals. The delay between the signals is determined at the synchroniser, and the method comprises extracting the delay from the synchroniser. The method may enable a delay between the signals to be obtained as an output of the process of synchronising the signals and without requiring the provision of additional monitoring equipment.

In an embodiment, the synchroniser comprises a framer. The polarisation mode dispersion compensated first digitised signal is framed by the framer into a first plurality of frames. The polarisation mode dispersion compensated second digitised signal is concurrently framed by the framer into a second plurality of frames. Each frame has a frame structure comprising a plurality of bytes. The delay between the signals is determined at the framer by determining a delay between a pre-selected byte of each frame of a concurrent pair of frames of each said plurality.

The method may enable a delay between the signals to be obtained as an output of the process of framing the signals and synchronising the parallel streams of frames and without requiring the provision of additional monitoring equipment.

In an embodiment, the polarisation mode dispersion compensated first digitised signal is split into a plurality of first sub-signals and each first sub-signal is received by a respective lane of the framer. Each first sub-signal is framed by the framer into a plurality of frames. The polarisation mode dispersion compensated second digitised signal is split into a plurality second sub-signals and each second sub-signal is received by a respective lane of the framer. Each second sub-signal is framed by the framer into a plurality of frames. The delay between the signals is determined at the framer by inspecting a pre-selected byte of a frame of a said first sub-signal and said pre-selected byte of a concurrent frame of a said second sub-signal. The method may enable a delay between the signals to be obtained as an output of the process of framing the signals and synchronising the frames in the lanes and without requiring the provision of additional monitoring equipment. In an embodiment, each frame has an optical transport network frame structure. The delay between the signals may therefore be determined by inspecting information in a pre-selected byte of a frame structure set by a standard, such as ITU-T G.709.

In an embodiment, the pre-selected byte comprises an indication of the polarisation of the respective signal.

In an embodiment, the sub-signals are mapped into their respective lanes in dependence on their polarisation and the delay between the signals is determined at the framer by inspecting a pre-selected byte of a frame in a first lane corresponding to the first polarisation and said pre-selected byte of a concurrent frame in a second lane corresponding to the second polarisation.

In an embodiment, the step of applying a polarisation mode dispersion compensation comprises applying one of a positive polarisation mode dispersion, a negative polarisation mode dispersion and zero polarisation mode dispersion.

In an embodiment, the polarisation multiplexed modulation format is a dual polarisation modulation format. In an embodiment, the dual polarisation modulation format is one of dual-polarisation quadrature phase-shift keying, DP-QPSK, and dual-polarisation 16 quadrature amplitude modulation, DP-16 QAM.

A second aspect of the invention provides optical signal monitoring apparatus comprising an optical receiver, a digital signal processor, a synchroniser and differential group delay monitoring apparatus. The optical receiver is arranged to receive an optical communications signal having a polarisation multiplexed modulation format. The optical receiver is arranged to demodulate the signal and is arranged to perform analogue to digital conversion of the signal to generate a first digitised signal corresponding to a first polarisation of the signal and to generate a second digitised signal corresponding to a second polarisation of the signal. The digital signal processor is arranged to receive the digitised signals and is arranged to apply a polarisation mode dispersion compensation to each of the digitised signals. The digital signal processor is arranged to obtain an indication of a channel transfer function of the optical communications signal. The digital signal processor is arranged to generate and transmit a first monitoring signal comprising the indication of the channel transfer function of the optical communications signal. The synchroniser is arranged to receive the polarisation mode dispersion compensated first and second digitised signals. The synchroniser is arranged to determine a delay between the first and second digitised signals and the synchroniser is arranged to synchronise the first and second digitised signals. The synchroniser is arranged to generate and transmit a second monitoring signal comprising an indication of the delay. The differential group delay monitoring apparatus is arranged to receive the first monitoring signal and is arranged to determine a differential group delay in dependence on the indication of the channel transfer function. The differential group delay monitoring apparatus is arranged to receive the second monitoring signal and is arranged to subtract the delay from the differential group delay to generate a corrected differential group delay. The differential group delay monitoring apparatus is arranged to generate and transmit a third monitoring signal comprising an indication of the corrected differential group delay.

The apparatus may be used to enable improved monitoring of differential group delay, DGD, of an optical communications signal having a polarisation multiplexed modulation format. The apparatus may be used to enable cost efficient, robust and accurate in-service monitoring of DGD. The apparatus may therefore be used to enable improved troubleshooting of communications traffic problems or faults, improved monitoring of cable ageing and margins, and improved fault prevention. The apparatus may also be used to enable improved signal quality monitoring and may allow for service quality differentiation. The apparatus may be used to enhance control plane functionalities related to DGD monitoring in an optical communications network, such as a wavelength switch optical network, WSON. This may enable provision of a reliable and real-time updated network status database, enabling impairment aware routing and on the fly protection switching in a WSON. Improved monitoring of DGD may enable optimisation of communications traffic paths in legacy 10G and 40G channels based on non-coherent technology. Improved monitoring of DGD may also enable improved network planning and upgrading using real measured DGD values. The apparatus may be used to enable fibre ageing monitoring to be performed by monitoring the DGD, and thus the PMD, of optical signals transmitted across a fibre. The apparatus may be used to enable PMD-sensitive communications traffic to be transmitted across an optical communications network. In an embodiment, the digital signal processor comprises a two-dimensional matched filter and the digital signal processor is arranged to extract an indication of the channel transfer function from the two-dimensional matched filter. The apparatus may enable DGD monitoring without decreasing the signal power and without requiring the provision of additional monitoring equipment.

In an embodiment, the two-dimensional matched filter comprises a plurality of taps and the indication of the channel transfer function comprises an output of each of the taps.

In an embodiment, the two-dimensional matched filter comprises at least five taps. This may enable the compensated DGD to be accurate to within ten percent of the actual DGD experienced by the optical communications signal.

In an embodiment, the two-dimensional matched filter comprises at least eleven taps. This may enable the compensated DGD to be accurate to within one percent of the actual DGD experienced by the optical communications signal.

In an embodiment, the two-dimensional matched filter is an adaptive two-dimensional fractionally spaced feed forward equaliser and each tap has a tap coefficient. The feed forward equaliser is arranged to apply a minimum mean square error, MMSE, criterion to adjust the tap coefficients to cause the feed forward equaliser to operate as a two-dimensional matched filter. The may enable a DGD value to be obtained by analysing the configuration of the equaliser following adaption of the equaliser to the signal.

In an embodiment, the feed forward equaliser is arranged to adaptively adjust the tap coefficients to cause each tap to have a respective output having a steady-state value and the digital signal processor is arranged to extract the steady-state value of each tap. In an embodiment, the synchroniser comprises a framer arranged to frame the polarisation mode dispersion compensated first digitised signal into a first plurality of frames and arranged to concurrently frame the polarisation mode dispersion compensated second digitised signal into a second plurality of frames. Each frame has a frame structure comprising a plurality of bytes. The framer is arranged to determine the delay between the signals by determining a delay between a pre-selected byte of each frame of a concurrent pair of frames of each said plurality. A delay between the signals may be obtained as an output of the framer acting to frame the signals and to synchronise the parallel streams of frames, and without requiring the provision of additional monitoring equipment.

In an embodiment, the framer comprises a plurality of lanes. The polarisation mode dispersion compensated first digitised signal is split into a plurality first sub-signals and each first sub-signal is received by a respective lane of the framer. The framer is arranged to frame each first sub-signal into a plurality of frames. The polarisation mode dispersion compensated second digitised signal is split into a plurality second sub-signals and each second sub-signal is received by a respective lane of the framer. The framer is arranged to frame each second sub-signal into a plurality of frames. The framer is arranged to determine the delay between the signals by inspecting a pre-selected byte of a frame of a said first sub-signal and said pre-selected byte of a concurrent frame of a said second sub-signal. The method may enable a delay between the signals to be obtained as an output of the process of framing the signals and synchronising the frames in the lanes and without requiring the provision of additional monitoring equipment.

In an embodiment, each frame has an optical transport network frame structure. The delay between the signals may therefore be determined by inspecting information in a pre-selected byte of a frame structure set by a standard, such as ITU-T G.709.

In an embodiment, the pre-selected byte comprises an indication of the polarisation of the respective signal.

In an embodiment, the framer is arranged to map the sub-signals into their respective lanes in dependence on their polarisation. The framer is arranged to determine the delay between the signals by inspecting a pre-selected byte of a frame in a first lane corresponding to the first polarisation and said pre-selected byte of a concurrent frame in a second lane corresponding to the second polarisation.

In an embodiment, the digital signal processor is arranged to apply one of a positive polarisation mode dispersion, a negative polarisation mode dispersion and zero polarisation mode dispersion.

In an embodiment, the optical receiver comprises a digital coherent receiver.

In an embodiment, the polarisation multiplexed modulation format is a dual polarisation modulation format. In an embodiment, the dual polarisation modulation format is one of dual-polarisation quadrature phase-shift keying, DP-QPSK, and dual-polarisation 16 quadrature amplitude modulation, DP-16 QAM.

A third aspect of the invention provides a communications network node comprising optical signal monitoring apparatus. The optical signal monitoring apparatus comprises an optical receiver, a digital signal processor, a synchroniser and differential group delay monitoring apparatus. The optical receiver is arranged to receive an optical communications signal having a polarisation multiplexed modulation format. The optical receiver is arranged to demodulate the signal and is arranged to perform analogue to digital conversion of the signal to generate a first digitised signal corresponding to a first polarisation of the signal and to generate a second digitised signal corresponding to a second polarisation of the signal. The digital signal processor is arranged to receive the digitised signals and is arranged to apply a polarisation mode dispersion compensation to each of the digitised signals. The digital signal processor is arranged to obtain an indication of a channel transfer function of the optical communications signal. The digital signal processor is arranged to generate and transmit a first monitoring signal comprising the indication of the channel transfer function of the optical communications signal. The synchroniser is arranged to receive the polarisation mode dispersion compensated first and second digitised signals. The synchroniser is arranged to determine a delay between the signals and the synchroniser is arranged to synchronise the signals. The synchroniser is arranged to generate and transmit a second monitoring signal comprising an indication of the delay. The differential group delay monitoring apparatus is arranged to receive the first monitoring signal and is arranged to determine a differential group delay in dependence on the indication of the channel transfer function. The differential group delay monitoring apparatus is arranged to receive the second monitoring signal and is arranged to subtract the delay from the differential group delay to generate a corrected differential group delay. The differential group delay monitoring apparatus is arranged to generate and transmit a third monitoring signal comprising an indication of the corrected differential group delay.

The node may be used to enable improved monitoring of differential group delay, DGD, of an optical communications signal having a polarisation multiplexed modulation format. The node may be used to enable cost efficient, robust and accurate in-service monitoring of DGD. The node may therefore be used to enable improved trouble-shooting of communications traffic problems or faults, improved monitoring of cable ageing and margins, and improved fault prevention. The node may also be used to enable improved signal quality monitoring and may allow for service quality differentiation. The node may be used to enhance control plane functionalities related to DGD monitoring in an optical communications network, such as a wavelength switch optical network, WSON. This may enable provision of a reliable and real-time updated network status database, enabling impairment aware routing and on the fly protection switching in a WSON. Improved monitoring of DGD may enable optimisation of communications traffic paths in legacy 10G and 40G channels based on non-coherent technology. Improved monitoring of DGD may also enable improved network planning and upgrading using real measured DGD values. The node may be used to enable fibre ageing monitoring to be performed by monitoring the DGD, and thus the PMD, of optical signals transmitted across a fibre. The node may be used to enable PMD-sensitive communications traffic to be transmitted across an optical communications network.

In an embodiment, the digital signal processor comprises a two-dimensional matched filter and the digital signal processor is arranged to extract an indication of the channel transfer function from the two-dimensional matched filter. The node may enable DGD monitoring without decreasing the signal power and without requiring the provision of additional monitoring equipment.

In an embodiment, the two-dimensional matched filter comprises a plurality of taps and the indication of the channel transfer function comprises an output of each of the taps.

In an embodiment, the two-dimensional matched filter comprises at least five taps. This may enable the compensated DGD to be accurate to within ten percent of the actual DGD experienced by the optical communications signal.

In an embodiment, the two-dimensional matched filter comprises at least eleven taps. This may enable the compensated DGD to be accurate to within one percent of the actual DGD experienced by the optical communications signal.

In an embodiment, the two-dimensional matched filter is an adaptive two-dimensional fractionally spaced feed forward equaliser and each tap has a tap coefficient. The feed forward equaliser is arranged to apply a minimum mean square error, MMSE, criterion to adjust the tap coefficients to cause the feed forward equaliser to operate as a two-dimensional matched filter. The may enable a DGD value to be obtained by analysing the configuration of the equaliser following adaption of the equaliser to the signal.

In an embodiment, the feed forward equaliser is arranged to adaptively adjust the tap coefficients to cause each tap to have a respective output having a steady-state value and the digital signal processor is arranged to extract the steady-state value of each tap.

In an embodiment, the synchroniser comprises a framer arranged to frame the polarisation mode dispersion compensated first digitised signal into a first plurality of frames and arranged to concurrently frame the polarisation mode dispersion compensated second digitised signal into a second plurality of frames. Each frame has a frame structure comprising a plurality of bytes. The framer is arranged to determine the delay between the signals by determining a delay between a pre-selected byte of each frame of a concurrent pair of frames of each said plurality. A delay between the signals may be obtained as an output of the framer acting to frame the signals and to synchronise the parallel streams of frames, and without requiring the provision of additional monitoring equipment.

In an embodiment, the framer comprises a plurality of lanes. The polarisation mode dispersion compensated first digitised signal is split into a plurality first sub-signals and each first sub-signal is received by a respective lane of the framer. The framer is arranged to frame each first sub-signal into a plurality of frames. The polarisation mode dispersion compensated second digitised signal is split into a plurality second sub-signals and each second sub-signal is received by a respective lane of the framer. The framer is arranged to frame each second sub-signal into a plurality of frames. The framer is arranged to determine the delay between the signals by inspecting a pre-selected byte of a frame of a said first sub-signal and said pre-selected byte of a concurrent frame of a said second sub-signal. The method may enable a delay between the signals to be obtained as an output of the process of framing the signals and synchronising the frames in the lanes and without requiring the provision of additional monitoring equipment.

In an embodiment, each frame has an optical transport network frame structure. The delay between the signals may therefore be determined by inspecting information in a pre-selected byte of a frame structure set by a standard, such as ITU-T G.709.

In an embodiment, the pre-selected byte comprises an indication of the polarisation of the respective signal.

In an embodiment, the framer is arranged to map the sub-signals into their respective lanes in dependence on their polarisation. The framer is arranged to determine the delay between the signals by inspecting a pre-selected byte of a frame in a first lane corresponding to the first polarisation and said pre-selected byte of a concurrent frame in a second lane corresponding to the second polarisation.

In an embodiment, the digital signal processor is arranged to apply one of a positive polarisation mode dispersion, a negative polarisation mode dispersion and zero polarisation mode dispersion.

In an embodiment, the polarisation multiplexed modulation format is a dual polarisation modulation format. In an embodiment, the dual polarisation modulation format is one of dual-polarisation quadrature phase-shift keying, DP-QPSK, and dual-polarisation 16 quadrature amplitude modulation, DP-16 QAM.

A fourth aspect of the invention provides a non-transitory computer-readable storage medium storing instructions, that if executed by a processor, will cause the processor to perform any of the above steps of the method of monitoring a differential group delay of an optical communications signal having a polarisation multiplexed modulation format.

DETAILED DESCRIPTION

Figure 1:
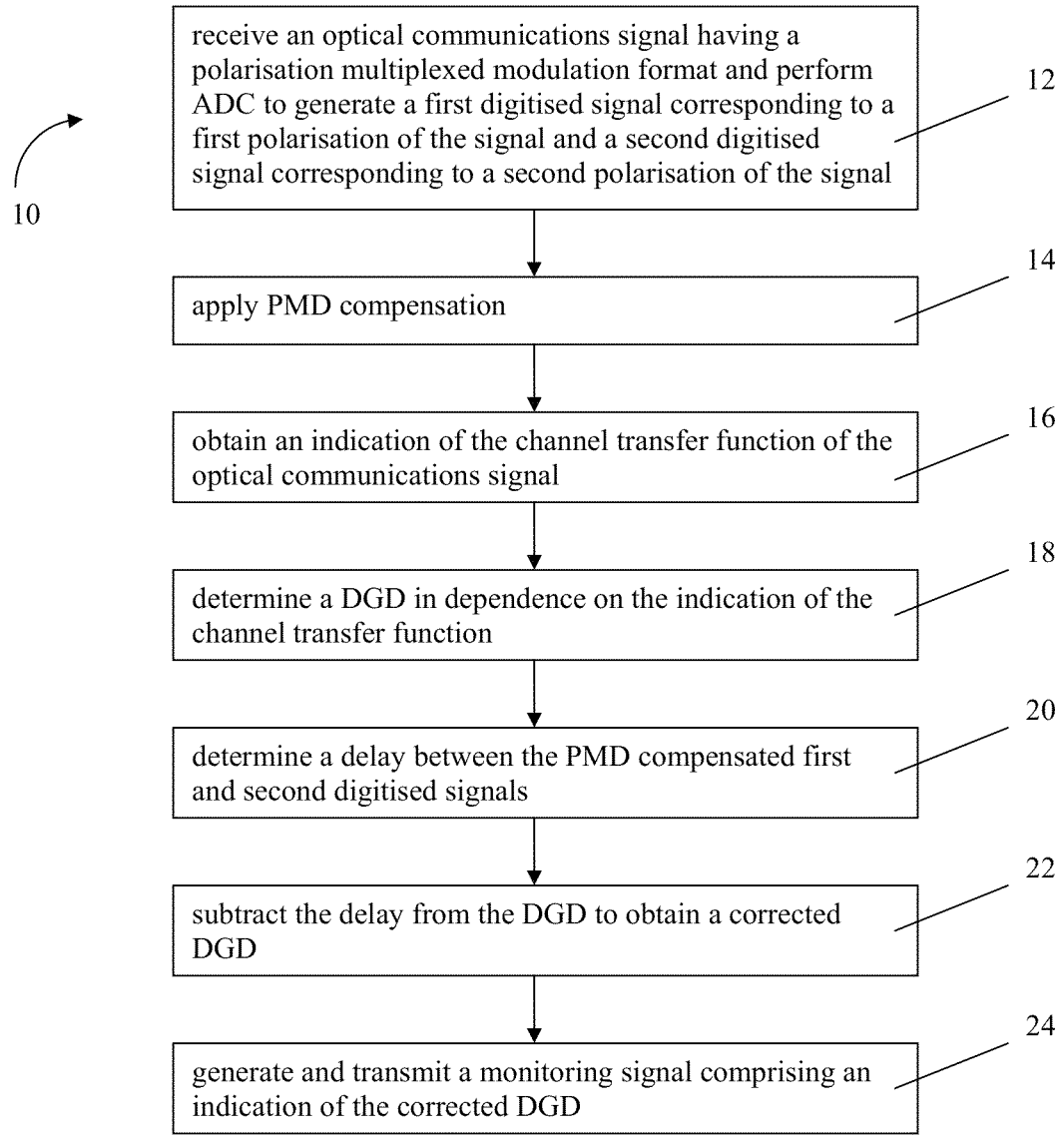
FIG. 1 shows the steps of a method according to a first embodiment of the invention of monitoring a differential group delay of an optical communications signal having a polarisation multiplexed modulation format.

FIG. 1 shows the operations of a method 10 of monitoring a differential group delay (DGD) of an optical communications signal having a polarisation multiplexed modulation format, according to a first embodiment of the invention.

The method 10 includes the operations of receiving an optical communications signal and performing analogue to digital conversion of the signal to generate a first digitised signal corresponding to a first polarisation of the signal and to generate a second digitised signal corresponding to a second polarisation of the signal (at block 12), applying a polarisation mode dispersion compensation to each of the digitised signals (at block 14), and obtaining an indication of the channel transfer function of the optical communications signal (at block 16). The method further includes the operations of determining a differential group delay in dependence on the indication of the channel transfer function (at block 18), determining a delay between the polarisation mode dispersion compensated first digitised signal and the polarisation mode dispersion compensated second digitised signal (at block 20), subtracting the delay from the differential group delay to obtain a corrected differential group delay (at block 22), and generating and transmitting a monitoring signal comprising an indication of the corrected differential group delay (at block 24).

Figure 2:
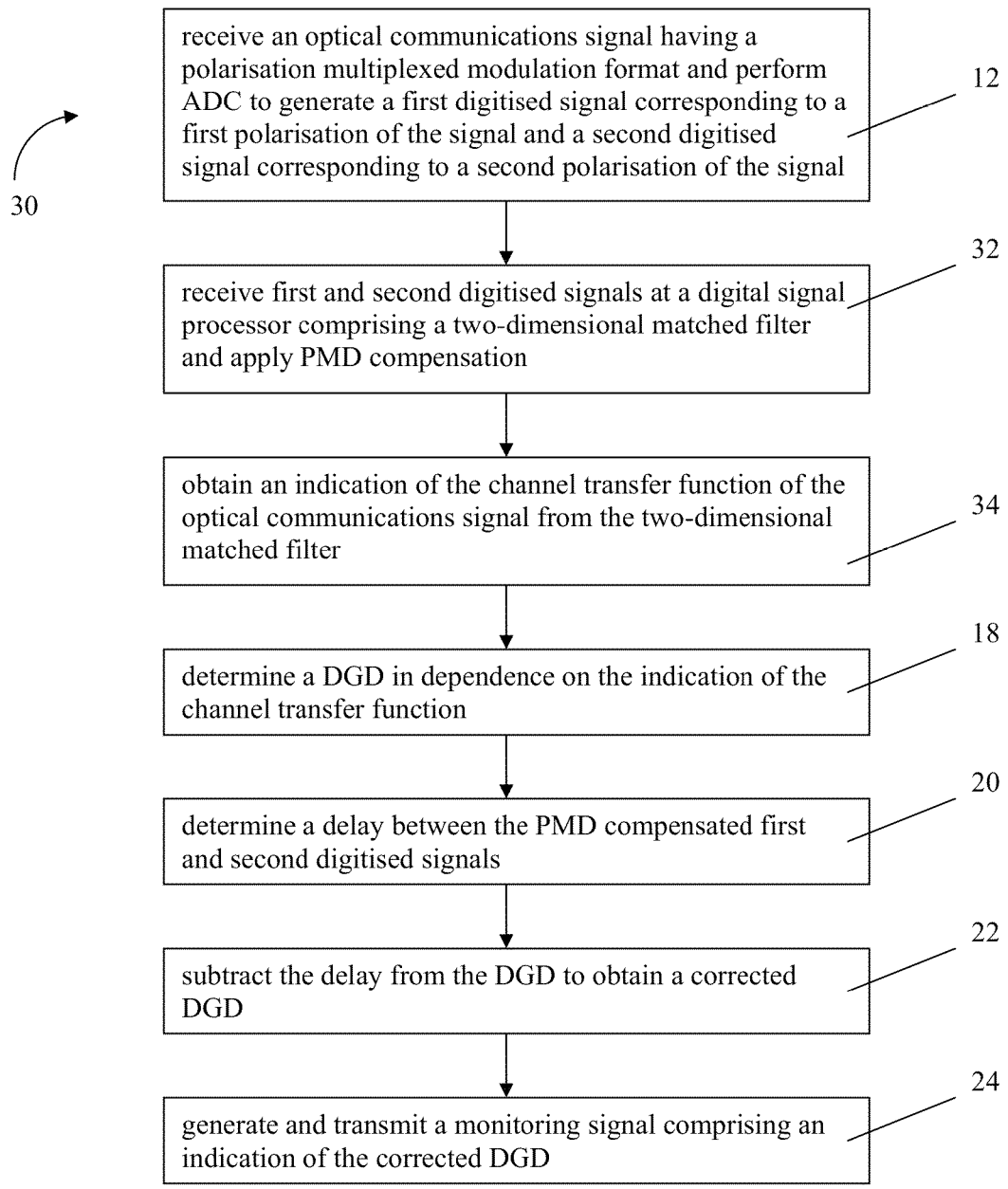
FIG. 2 shows the steps of a method according to a second embodiment of the invention of monitoring a differential group delay of an optical communications signal having a polarisation multiplexed modulation format.

FIG. 2 shows the operations of a method 30 of monitoring a DGD of an optical communications signal having a polarisation multiplexed modulation format, according to a second embodiment of the invention. The operations of the method 30 of this embodiment are similar to the operations of the method 10 shown in FIG. 1, with the following modifications. The same reference numbers are retained for corresponding blocks.

In this embodiment, the first and second digitised signals are received at a digital signal processor (DSP), comprising a two-dimensional matched filter and the PMD compensation is performed by the DSP (at block 32). The indication of the channel transfer function of the optical communications signal is obtained from the two-dimensional matched filter (at block 34).

In a third embodiment, having the same method operations as shown in FIG. 2, the two-dimensional matched filter comprises at least five taps, in this example eleven taps, and the indication of the channel transfer function comprises an output of each of the taps.

Figure 3:
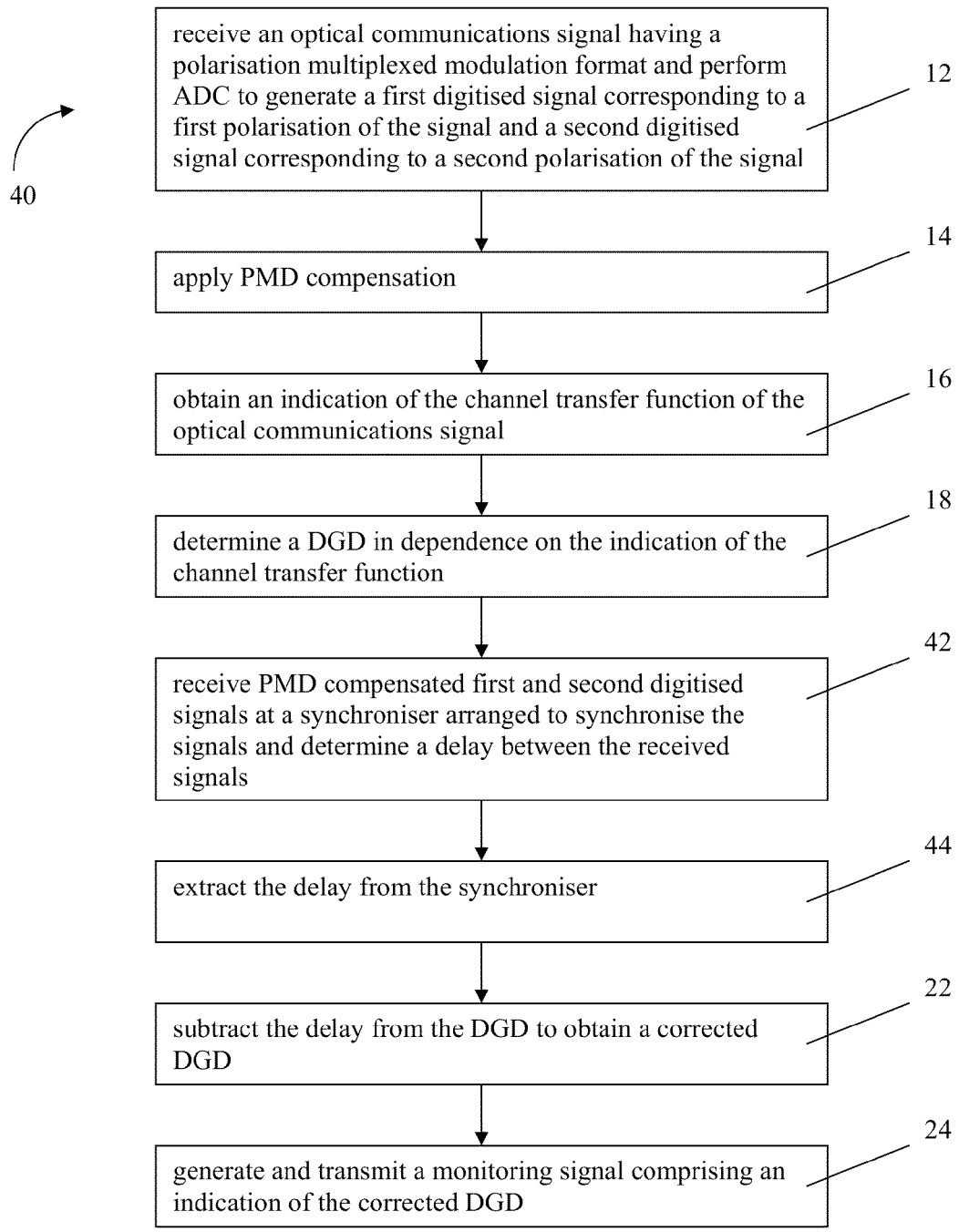
FIG. 3 shows the steps of a method according to a fourth embodiment of the invention of monitoring a differential group delay of an optical communications signal having a polarisation multiplexed modulation format.

FIG. 3 shows the operations of a method 40 of monitoring a DGD of an optical communications signal having a polarisation multiplexed modulation format, according to a fourth embodiment of the invention. The operations of the method 40 of this embodiment are similar to the operations of the method 10 shown in FIG. 1, with the following modifications. The same reference numbers are retained for corresponding blocks.

In this embodiment, the PMD compensated first and second digitised signals are received at a synchroniser arranged to synchronise the signals, and the delay between the signals is determined at the synchroniser (at block 42). The delay is extracted from the synchronizer (at block 44).

Figure 4:
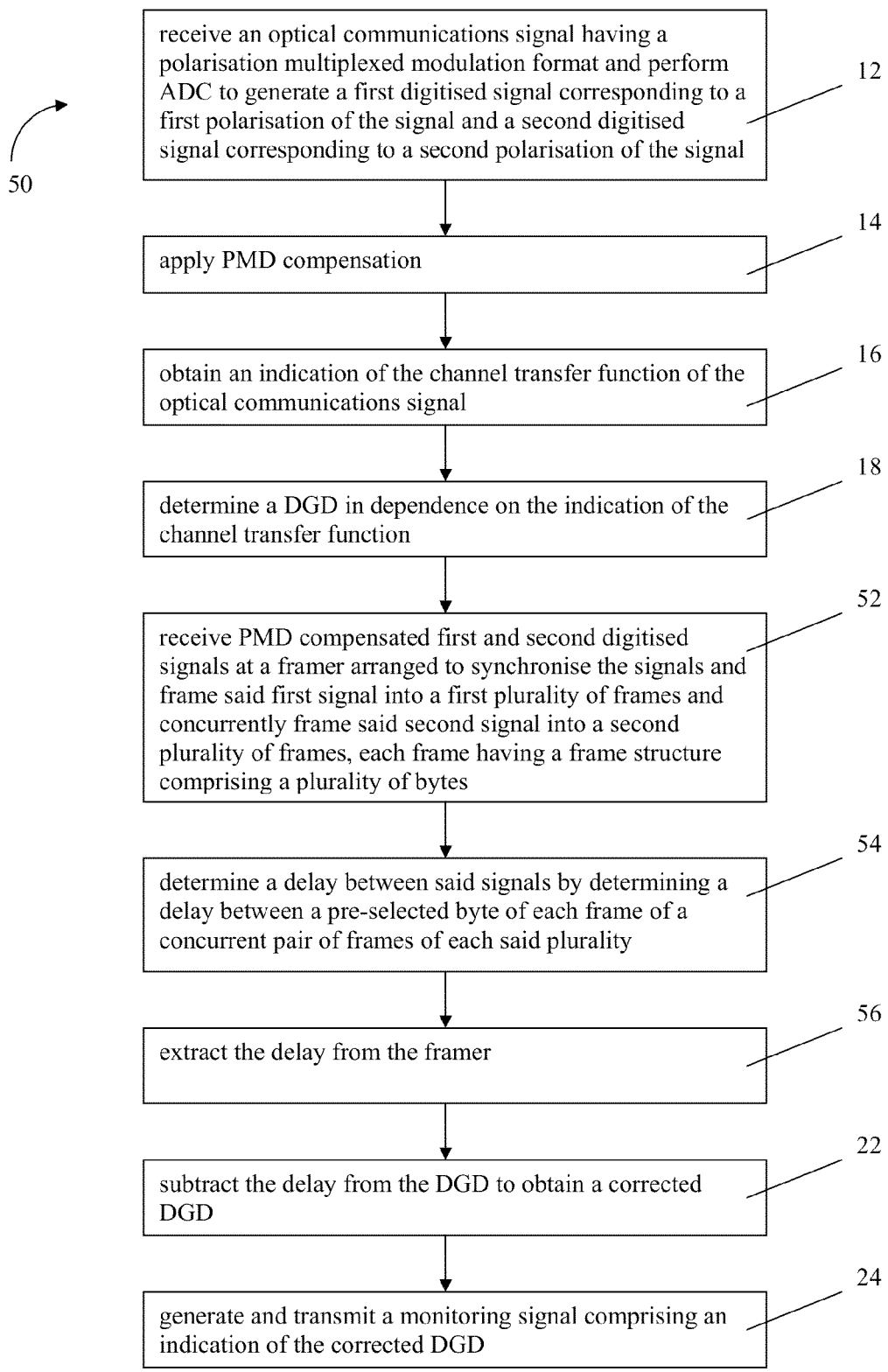
FIG. 4 shows the steps of a method according to a fifth embodiment of the invention of monitoring a differential group delay of an optical communications signal having a polarisation multiplexed modulation format.

The operations of a method 50 of monitoring a DGD of an optical communications signal having a polarisation multiplexed modulation format, according to a fifth embodiment of the invention are shown in FIG. 4. The operations of the method 50 of this embodiment are similar to the operations of the method 10 shown in FIG. 1, with the following modifications. The same reference numbers are retained for corresponding blocks.

In this embodiment, the PMD compensated first and second digitised signals are received at a framer arranged to synchronise the signals (at block 52). The PMD compensated first digitised signal is framed by the framer into a first plurality of frames (at block 52). The PMD compensated second digitised signal is concurrently framed by the framer into a second plurality of frames (at block 52). Each frame has a frame structure comprising a plurality of bytes (at block 52). The delay between the signals is determined at the framer by determining a delay between a pre-selected byte of each frame of a concurrent pair of frames of each said plurality (at block 54). The delay is extracted from the framer (at block 56).

In a sixth embodiment of the invention, having the same method operations as shown in FIG. 4, the optical communications signal has a dual-polarisation modulation format, such as DP-QPSK or DP-16 QAM. Each frame has an optical transport network (OTN) frame structure. The delay between the signals is determined at the framer by determining a delay between a byte of each OTN frame which comprises an indication of the polarisation of the respective signal.

The operations of applying a PMD compensation comprises applying one of a positive PMD, a negative PMD and zero PMD, according to what PMD has been experienced by the optical signal during transmission.

Figure 5:
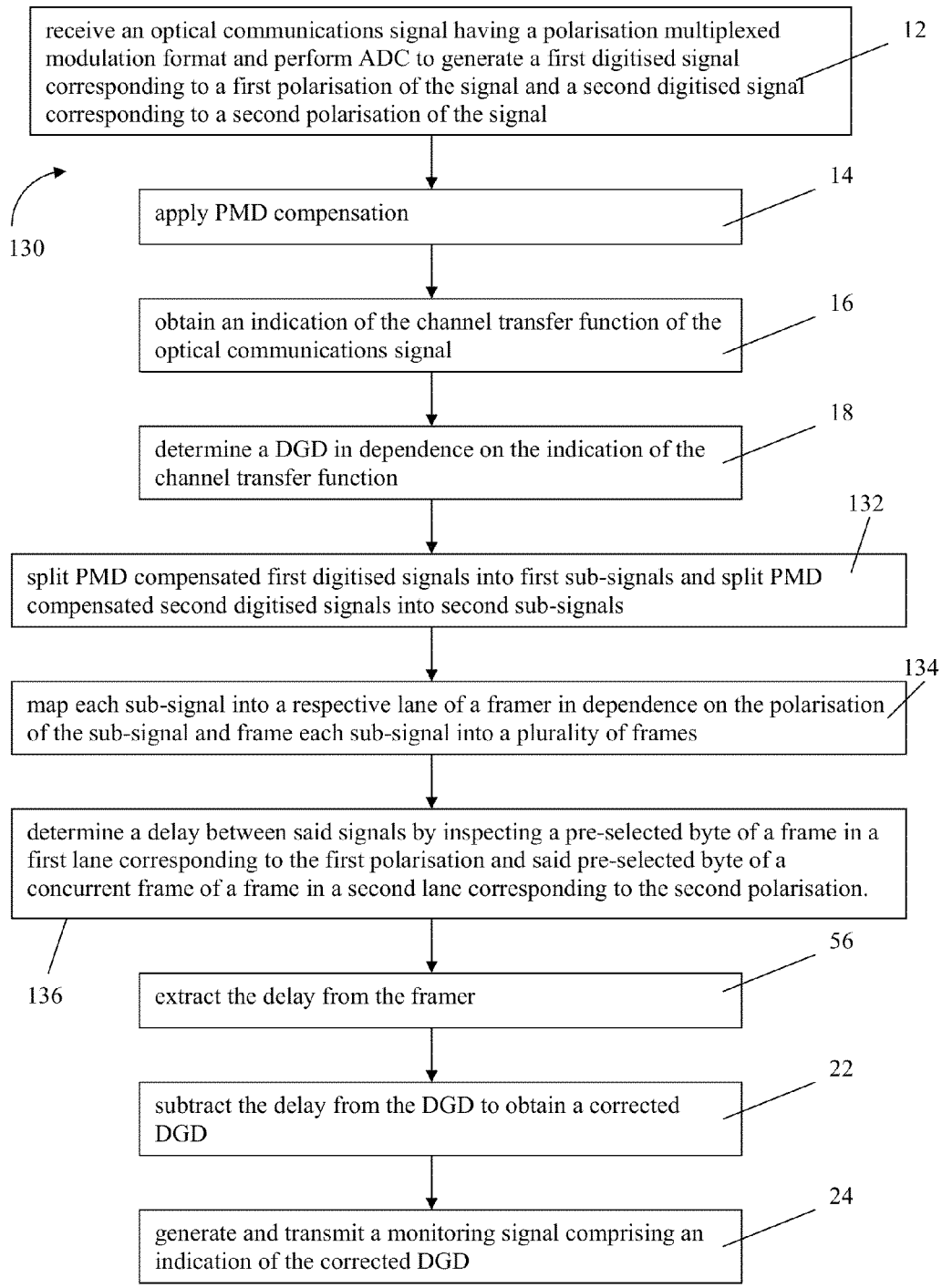
FIG. 5 shows the steps of a method according to a seventh embodiment of the invention of monitoring a differential group delay of an optical communications signal having a polarisation multiplexed modulation format.

A seventh embodiment of the invention provides a method 130 of monitoring a DGD of an optical communications signal having a polarisation multiplexed modulation format, having the operations shown in FIG. 5. The operations of the method 130 of this embodiment are similar to the operations of the method 50 shown in FIG. 4, with the following modifications. The same reference numbers are retained for corresponding blocks.

In this embodiment, the PMD compensated first digitised signal is split into a plurality of first sub-signals (at block 132) and the PMD compensated second digitised signal is split into a plurality second sub-signals (at block 132). The framer comprises a plurality of lanes and the sub-signals are mapped into respective lanes in dependence on their polarisation (at block 134).

Each first sub-signal is framed by the framer into a plurality of frames and each second sub-signal is framed by the framer into a plurality of frames (at block 134).

The delay between the PMD compensated first and second signals is determined at the framer by inspecting a pre-selected byte of a frame in a first lane corresponding to the first polarisation and the same pre-selected byte of a concurrent frame in a second lane corresponding to the second polarisation.

In this embodiment, the pre-selected byte is a standard OTN byte of the OTN frame and does not comprise an indication of the polarisation of the signal. Rather the polarisation can be determined by identifying which lane the sub-signal has been mapped into.

Figure 6:
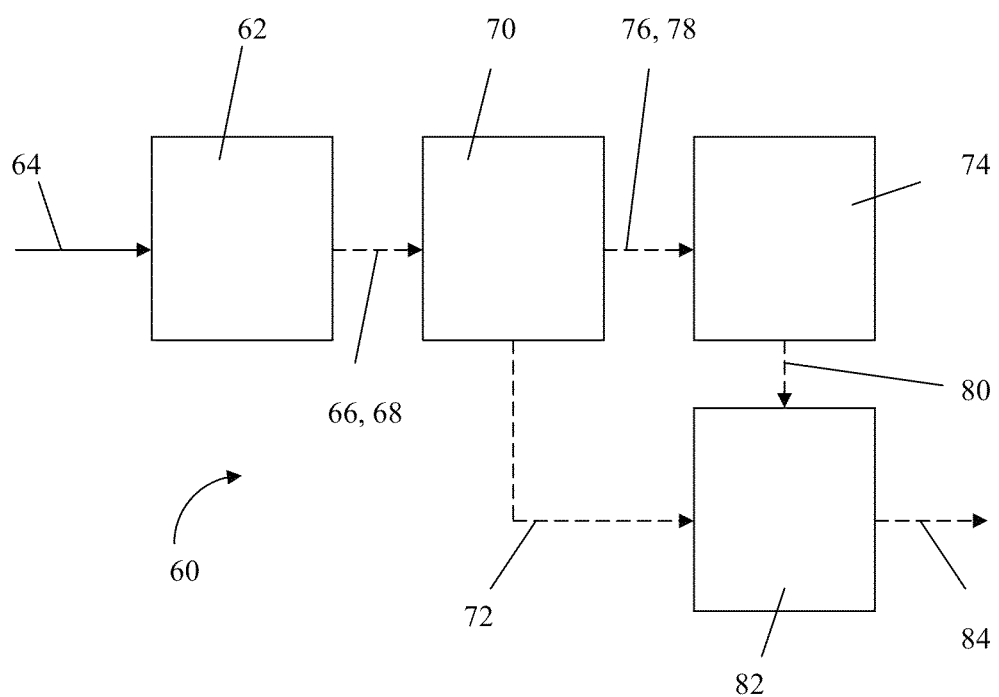
FIG. 6 is a schematic representation of optical signal monitoring apparatus according to an eighth embodiment of the invention.

An eighth embodiment of the invention provides optical signal monitoring apparatus 60 as shown in FIG. 6. The optical signal monitoring apparatus comprises an optical receiver 62, a digital signal processor (DSP) 70, a synchroniser 74 and differential group delay (DGD)monitoring apparatus 82.

The optical receiver 62 is arranged to receive an optical communications signal 64 having a polarisation multiplexed modulation format. The optical receiver is arranged to demodulate the signal. The optical receiver is additionally arranged to perform analogue to digital conversion (ADC) of the signal to generate a first digitised signal 66 corresponding to a first polarisation of the signal 64 and to generate a second digitised signal 68 corresponding to a second polarisation of the signal.

The DSP 70 is arranged to receive the digitised signals 66, 68 and is arranged to apply a polarisation mode dispersion (PMD) compensation to each of the digitised signals. The DSP is arranged to obtain an indication of the channel transfer function of the optical communications signal 64. The DSP is arranged to generate and transmit a first monitoring signal 72 comprising the indication of the channel transfer function of the optical communications signal.

The synchroniser 74 is arranged to receive the PMD compensated first and second digitised signals 76, 78 and is arranged to determine a delay between the signals. The synchroniser is arranged to synchronise the signals and is arranged to generate and transmit a second monitoring signal 80 comprising an indication of the delay.

The DGD monitoring apparatus 82 is arranged to receive the first monitoring signal 72 and to determine a DGD in dependence on the indication of the channel transfer function. The DGD monitoring apparatus is arranged to receive the second monitoring signal 80 and is arranged to subtract the delay provided by the second monitoring signal from the DGD to generate a corrected DGD. The DGD monitoring apparatus is arranged to generate and transmit a third monitoring signal 84 comprising an indication of the corrected DGD.

Figure 7:
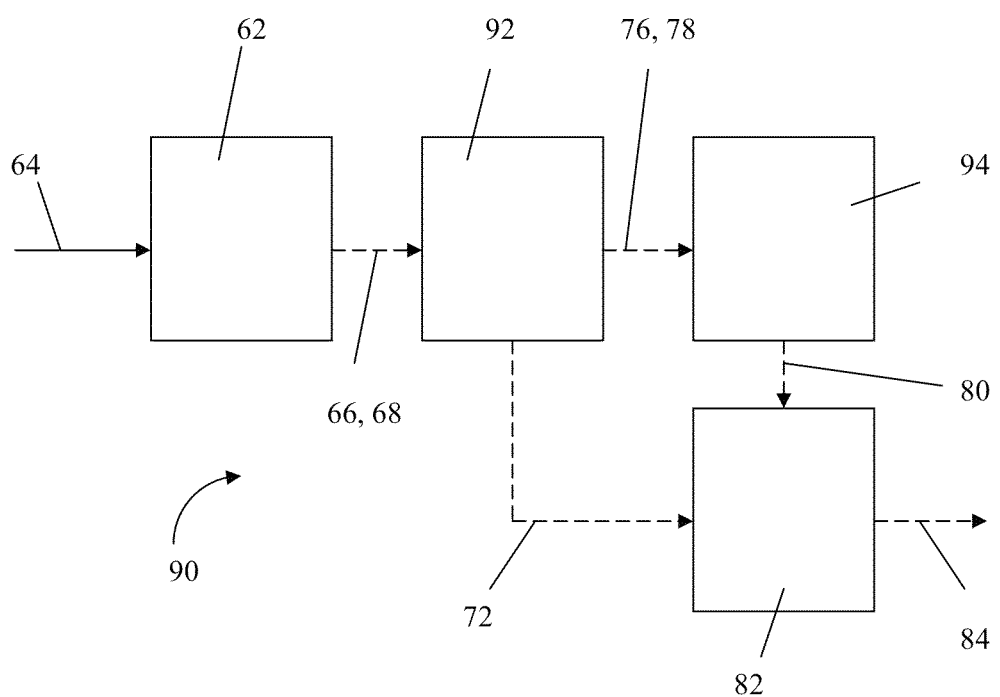
FIG. 7 is a schematic representation of optical signal monitoring apparatus according to a ninth embodiment of the invention.

A ninth embodiment of the invention provides optical signal monitoring apparatus 90 as shown in FIG. 7. The optical signal monitoring apparatus 90 of this embodiment is similar to the optical signal monitoring apparatus 60 shown in FIG. 6, with the following modifications. The same reference numbers are retained for corresponding features.

In this embodiment the DSP 92 comprises a two-dimensional matched filter. The two-dimensional matched filter comprises a plurality of taps. The DSP is arranged to extract an output of each of the taps from the two-dimensional matched filter.

The synchroniser in this embodiment comprises a framer 94. The framer 94 is arranged to frame the PMD compensated first digitised signal 76 into a first plurality of frames and to frame the PMD compensated second digitised signal 78 into a second plurality of frames. Each frame has a frame structure comprising a plurality of bytes. The framer is arranged to determine the delay between the signals 76, 78 by determining a delay between a pre-selected byte of each frame of a concurrent pair of frames of the two pluralities of frames.

Figure 8:
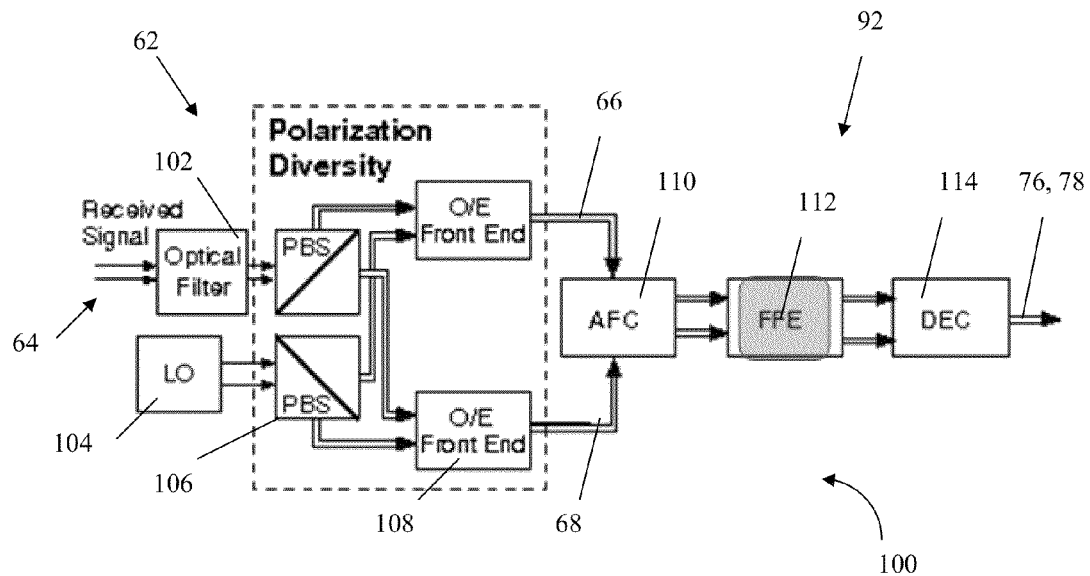
FIG. 8 is a schematic representation of optical signal monitoring apparatus according to a tenth embodiment of the invention.

A tenth embodiment of the invention provides optical signal monitoring apparatus, a receiver apparatus 100 of which is shown in FIG. 8. The optical signal monitoring apparatus of this embodiment is similar to the optical signal monitoring apparatus 90 shown in FIG. 7, with the following modifications. The same reference numbers are retained for corresponding features.

The optical receiver 62 is arranged to receive an optical communications signal 64 having a dual-polarisation modulation format, such as dual polarisation quadrature phase shift keying (DP QPSK),or dual polarisation 16 quadrature amplitude modulation (DP 16 QAM).

In this embodiment the optical receiver 62 comprises a digital coherent receiver comprising an input optical filter 102, a local oscillator 104, a 90° optical hybrid comprising first and second polarizing beam splitters (PBS) 106, and first and second balanced detectors 108. The design and operation of a digital coherent receiver of this type will be well known to the person skilled in the art.

In this embodiment the two-dimensional match filter comprises an adaptive two-dimensional fractionally spaced feed forward equalizer (FFE) 112. The FFE has at least five taps and in this embodiment has eleven taps. Each tap has a tap coefficient. The FFE 112 is arranged to apply the minimum mean square error (MMSE) criterion to adapt its tap coefficients in order to converge its operation to a two-dimensional matched filter, as reported by G. Colavolpe et al, "Robust multilevel coherent optical systems with linear processing at the receiver," J. Lightwave Technol., vol.27, no.13, pages 2357-2369, 2009.

The DSP 92 additionally comprises automatic frequency control(AFC) apparatus 110, and symbol decision making apparatus (DEC) 114.

The PMD compensated digitized signals 76, 78 are split into a plurality of first sub-signals and a plurality of second sub-signals respectively. The framer 94 has a plurality of lanes and each sub-signal is mapped into a respective lane in dependence on its polarization. In this example, the framer 94 has an optical channel transport lane level 4 (OTL4.10) interface and comprises 10 links at 11Gb/s, to provide a 100Gb/s interface according to ITU-T G.709.

The framer 94 is arranged to frame each sub-signal into frames having an optical transport network (OTN) frame structure. The framer 94 is arranged to determine the delay between the signals 76, 78 by inspecting a pre-selected byte of a frame in a first lane corresponding to the first PMD compensated signal 76 (having the first polarisation) and the same pre-selected byte of a concurrent frame in a second lane corresponding to the second PMD compensated signal 78 (having the second polarisation).

In this embodiment, the polarisation of the frames which are inspected is determined according to their lane assignment. In an alternative arrangement, the pre-selected byte comprises an indication of the polarisation of the respective PMD compensated signal 76, 78.

An FFE 112 of sufficient length is able to perfectly compensate for CD and PMD. The FFE frequency response $H_{FFE}(f)$ is here taken to be equal to the inverse channel frequency response $H_{ch}(f)$ of the received optical signal 64:

$$H_{FFE}(f) = H_{ch}^{-1}(f) = \begin{pmatrix} H_{11}(f) & H_{12}(f) \\ H_{21}(f) & H_{22}(f) \end{pmatrix}.$$

In the weekly non-linear regime, the CD and PMD contribute together to the total channel impulse response (transfer function). The effects of CD and PMD can be separated, giving an inverse channel frequency response equal to:

$$H_{FFE}(f) = D(f) \cdot U(f)$$

where the CD contribution D(f) is a polarization independent linear function, that leads to a quadratic phase, while PMD is a frequency dependent effect and is represented by the unitary matrix U(f).

Normalizing $H_{FFE}(f)$, we obtain:

$$U(f) = \frac{H_{FFE}(f)}{\sqrt{\det(H_{FFE}(f))}} = \begin{pmatrix} u(f) & v(f) \\ -v^*(f) & u^*(f) \end{pmatrix}.$$

In order to estimate DGD, the matrix U(f) is inverted and derived with respect to frequency, ω:

$$J(\omega) = U(\omega)^{-1} \cdot \frac{\partial U(\omega)}{\partial \omega}.$$

The DGD is then related to the imaginary part of the eigenvalue of matrix J calculated at the central frequency:

$$DGD = 2 \cdot \Im(\text{eigenvalue}(J(\omega))).$$

This methodology will be well known to the person skilled in the art and is reported in detail by Ip et al, "Fiber impairment compensation using coherent detection and digital signal processing", J. Lightwave Technol. vol. 28, pages 502-519, 2010.

The optical signal monitoring apparatus shown in FIG. 8 was tested for a 100 Gigabit/second optical signal 64 having a DP-QPSK modulation format. Two communications traffic symbol streams were launched, after linear modulation, on two orthogonal states of polarisation of a single mode optical fibre, which introduced CD and PMD to the optical signal during propagation of the optical signal through the fibre. The transmitted signal also experienced optical amplification before arriving at the receiver apparatus.

The optical signal monitoring apparatus 100 was tested using Monte Carlo simulations. During a signal acquisition phase, the FFE taps were adaptively adjusted according to the Constant Modulus Algorithm, CMA, and then according to the decision-directed Least Mean Square, LMS, algorithm, both with symbol-time adjustment. In order to help convergence, the FFE step-size was progressively reduced. The steady-state values of the FFE taps were extracted as the indication of the channel transfer function of the signal.

Every residual delay within an optical transmission system before the optical receiver apparatus affects the value of the DGD which is calculated from the output taps of the FFE 112. The FFE 112 tries to invert the PMD that has been added to the optical signal during transmission. It was found that the FFE only inverts the channel transfer function matrix of the optical signal if the DGD is an integer multiple of the symbol interval (Ts) and the FFE will add a delay between the two polarisations in order to meet this criteria. The delay which is added does not affect the performance of the optical receiver apparatus 100 but the value of the DGD which is obtained from the DSP 92 is not accurate.

The framer 94 is arranged to synchronise the frames corresponding to the two polarisations, so that concurrent frames of the two polarisations are synchronous. To do this the framer determines if there is a delay between the frames of the two polarisations and determines the size of any delay, as described above. This delay corresponds to any delay which has not been compensated for by the DSP 92 and any delay introduced by the FFE 112. By subtracting this delay from the value of the DGD obtained by the DSP 92 a corrected DGD value is obtained which more truly represents the DGD of the optical signal 64.

Figure 9:
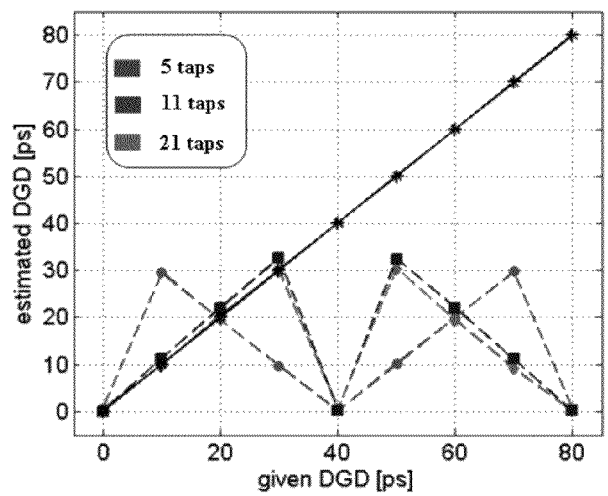
FIG. 9 shows the DGD value obtained from the DSP (estimated DGD) as a function of the actual DGD (given DGD) of an optical signal using an FFE with 5 taps, 11 taps and 21 taps, for $E_b/N_0=10$ dB.

FIG. 9 shows the DGD value obtained from the DSP 92 (estimated DGD) as a function of the actual DGD (given DGD) of the optical signal using an FFE 112 with 5 taps, 11 taps and 21 taps.

Figure 10:
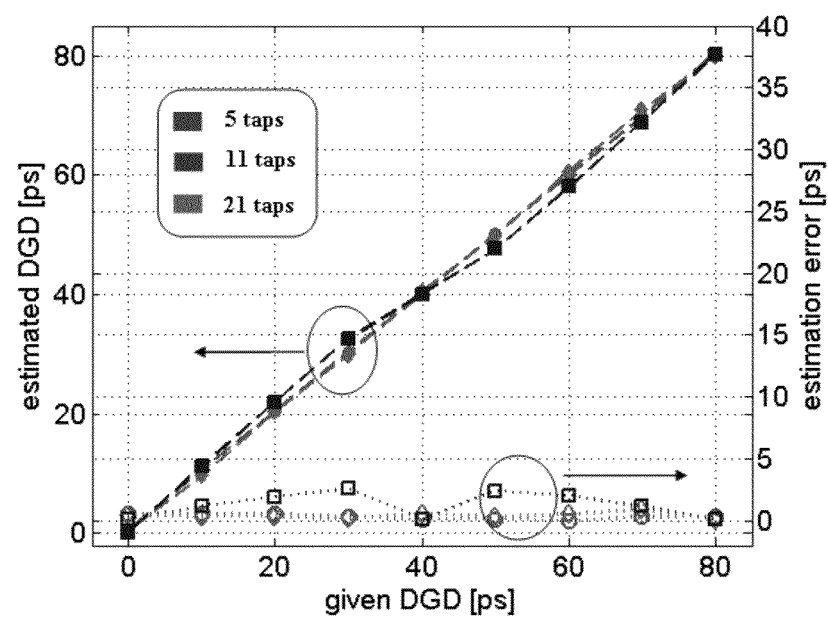
FIG. 10 shows: on right, the corrected DGD value (estimated DGD) as a function of the actual DGD (given DGD) for 5 taps, 11 taps and 21 taps; on left, the DGD error (estimation error)

FIG. 10 shows, referring to the left-hand y-axis, the corrected DGD value provided by the DGD monitoring apparatus 82 as a function of the actual DGD where the FFE 112 has 5 taps, 11 taps and 21 taps. FIG. 8 also shows, referring to the right-hand y-axis, the DGD error as a function of the actual DGD for the same set of taps.

It can be seen that the corrected DGD values shown in FIG. 10 are in significantly better agreement with the actual DGD than the un-corrected DGD values obtained from the DSP as shown in FIG. 9. The corrected DGD value agrees with the actual DGD value with an error less than 9% for 5 taps and less than 1% for 11 or 21 taps.

Figure 11:
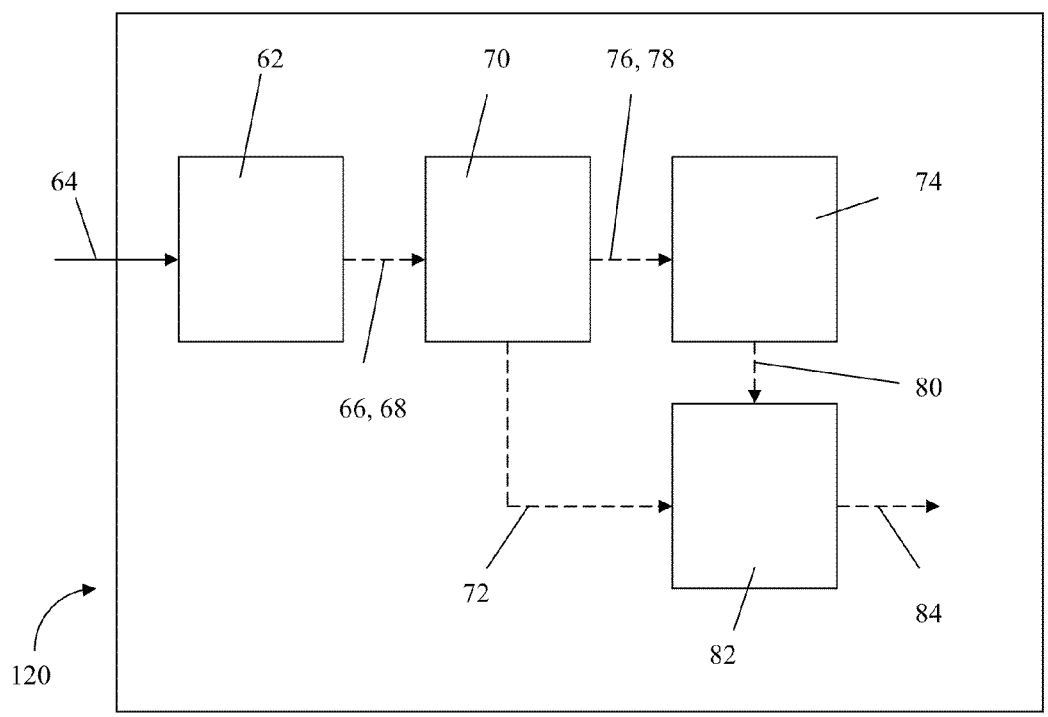
FIG. 11 is a schematic representation of a communications network node according to an eleventh embodiment of the invention.

An eleventh embodiment of the invention provides a communications network node 120 as shown in FIG. 11.

The communications network node 120 comprises optical signal monitoring apparatus 60 as shown in FIG. 6. It will be appreciated that either of the optical signal monitoring apparatus 90, 100 shown in FIGS. 7 and 8 could alternatively be used.

A twelfth embodiment of the invention provides a non-transitory computer-readable storage medium storing instructions, that if executed by a processor, will cause the processor to perform any of the operations of the method 10 of monitoring a DGD of an optical communications signal having a polarisation multiplexed modulation format, as shown in FIG. 1.

It will be appreciated that the instructions stored in the non-transitory computer-readable storage medium may alternatively comprise instructions to cause the processor to perform any of the operations of one of the methods 30, 40, 50 of monitoring a DGD of an optical communications signal having a polarisation multiplexed modulation format, as shown in FIGS. 2, 3 and 4.

What is claimed is:

1. A method of monitoring a differential group delay of an optical communications signal having a polarisation multiplexed modulation format, the method comprising:
   receiving the optical communications signal in an optical receiver and performing analogue to digital conversion of the optical communications signal to generate a first digitised signal corresponding to a first polarisation of the optical communications signal and to generate a second digitised signal corresponding to a second polarisation of the optical communications signal;
   applying a polarisation mode dispersion compensation to each of the digitised signals;
   obtaining an indication of the channel transfer function of the optical communications signal;
   determining the differential group delay in dependence on the indication of the channel transfer function;
   determining a delay between a polarisation mode dispersion compensated first digitised signal and a polarisation mode dispersion compensated second digitised signal;
   subtracting the delay from the differential group delay to obtain a corrected differential group delay; and
   generating and transmitting a monitoring signal comprising an indication of the corrected differential group delay.

2. The method as claimed in claim 1, wherein the first and second digitised signals are received at a digital signal processor comprising a two-dimensional matched filter and the indication of the channel transfer function is obtained from the two-dimensional matched filter.

3. The method as claimed in claim 1, wherein the polarisation mode dispersion compensated first and second digitised signals are received at a synchroniser arranged to synchronise the digitised signals, and the delay between the digitised signals is determined at the synchroniser, and the method further comprises extracting the delay from the synchroniser.

4. The method as claimed in claim 3, wherein the synchroniser comprises a framer and the polarisation mode dispersion compensated first digitised signal is framed by the framer into a first plurality of frames and the polarisation mode dispersion compensated second digitised signal is concurrently framed by the framer into a second plurality of frames, each of the frames having a frame structure comprising a plurality of bytes, and the delay between the digitised signals is determined at the framer by determining a delay between a pre-selected byte of each frame of a concurrent pair of frames, wherein the concurrent pair of frames comprises one frame from each of the pluralities of frames.

5. The method as claimed in claim 4, wherein the polarisation mode dispersion compensated first digitised signal is split into a plurality of first sub-signals and each first sub-signal is received by a respective lane of the framer, and each first sub-signal is framed by the framer into the first plurality of frames, and wherein the polarisation mode dispersion compensated second digitised signal is split into a plurality second sub-signals and each second sub-signal is received by a respective lane of the framer, and each second sub-signal is framed by the framer into the second plurality of frames, the delay between the digitised signals being determined at the framer by inspecting a pre-selected byte of a frame of the first sub-signal and the pre-selected byte of a concurrent frame of the second sub-signal.

6. The method as claimed in claim 4, wherein the pre-selected byte comprises an indication of the polarisation of the respective signal.

7. The method as claimed in claim 5, wherein the sub-signals are mapped into their respective lanes in dependence on their polarisation and the delay between the digitised signals is determined at the framer by inspecting the pre-selected byte of a frame in a first lane corresponding to the first polarisation and the pre-selected byte of a concurrent frame of a frame in a second lane corresponding to the second polarisation.

8. The method as claimed in claim 1, wherein the step of applying a polarisation mode dispersion compensation comprises applying one of a positive polarisation mode dispersion, a negative polarisation mode dispersion, and zero polarisation mode dispersion.

9. An optical signal monitoring apparatus comprising:
an optical receiver arranged to receive an optical communications signal having a polarisation multiplexed modulation format, the optical receiver being arranged to demodulate the signal and being arranged to perform analogue to digital conversion of the optical communications signal to generate a first digitised signal corresponding to a first polarisation of the optical communications signal and to generate a second digitised signal corresponding to a second polarisation of the optical communications signal;
a digital signal processor arranged to receive the digitised signals and being arranged to apply a polarisation mode dispersion compensation to each of the digitised signals, and being arranged to obtain an indication of a channel transfer function of the optical communications signal and the digital signal processor being arranged to generate and transmit a first monitoring signal comprising the indication of the channel transfer function of the optical communications signal;
a synchroniser arranged to receive a polarisation mode dispersion compensated first and second digitised signals and being arranged to determine a delay between the digitised signals, and the synchroniser being arranged to synchronise the digitised signals and being arranged to generate and transmit a second monitoring signal comprising an indication of the delay; and
a differential group delay monitoring apparatus arranged to receive the first monitoring signal and being arranged to determine a differential group delay in dependence on the indication of the channel transfer function, and the differential group delay monitoring apparatus being arranged to receive the second monitoring signal and being arranged to subtract the delay from the differential group delay to generate a corrected differential group delay, and the differential group delay monitoring apparatus being arranged to generate and transmit a third monitoring signal comprising an indication of the corrected differential group delay.

10. The optical signal monitoring apparatus as claimed in claim 9, wherein the digital signal processor comprises a two-dimensional matched filter and the digital signal processor is arranged to extract the indication of the channel transfer function from the two-dimensional matched filter.

11. The optical signal monitoring apparatus as claimed in claim 9, wherein the synchroniser comprises a framer arranged to frame the polarisation mode dispersion compensated first digitised signal into a first plurality of frames and arranged to concurrently frame the polarisation mode dispersion compensated second digitised signal into a second plurality of frames, each of the frames having a frame structure comprising a plurality of bytes, and the framer is arranged to determine the delay between the digitised signals by determining a delay between a pre-selected byte of each frame of a concurrent pair of frames, wherein the concurrent pair of frames comprises one frame from each of the pluralities of frames.

12. The optical signal monitoring apparatus as claimed in claim 11, wherein the framer comprises a plurality of lanes and the polarisation mode dispersion compensated first digitised signal is split into a plurality first sub-signals and each first sub-signal is received by a respective lane of the framer, and the framer is arranged to frame each first sub-signal into the first plurality of frames, and wherein the polarisation mode dispersion compensated second digitised signal is split into a plurality second sub-signals and each second sub-signal is received by a respective lane of the framer, and the framer is arranged to frame each second sub-signal into the second plurality of frames, and the framer is arranged to determine the delay between the digitised signals by inspecting the pre-selected byte of a frame of the first sub-signal and the preselected byte of a concurrent frame of the second sub-signal.

13. The optical signal monitoring apparatus as claimed in claim 11, wherein the pre-selected byte comprises an indication of the polarisation of the respective signal.

14. The optical signal monitoring apparatus as claimed in claim 12, wherein the framer is arranged to map the sub-signals into their respective lanes in dependence on their polarisation, and the framer is arranged to determine the delay between the digitised signals by inspecting the pre-selected byte of a frame in a first lane corresponding to the first polarisation and the pre-selected byte of a concurrent frame in a second lane corresponding to the second polarisation.

15. The optical signal monitoring apparatus as claimed in claim 9, wherein the digital signal processor is arranged to apply one of a positive polarisation mode dispersion, a negative polarisation mode dispersion, and zero polarisation mode dispersion.

16. The optical signal monitoring apparatus as claimed in claim 9, wherein the optical signal monitoring apparatus is part of a communications network node.

17. A non-transitory computer-readable storage medium storing instructions for monitoring a differential group delay of an optical communications signal having a polarisation multiplexed modulation format, the instructions, if executed by a processor, will cause the processor to perform operations comprising:
   receiving the optical communications signal and performing analogue to digital conversion of the optical communications signal to generate a first digitised signal corresponding to a first polarisation of the optical communications signal and to generate a second digitised signal corresponding to a second polarisation of the optical communications signal;
   applying a polarisation mode dispersion compensation to each of the digitised signals;
   obtaining an indication of the channel transfer function of the optical communications signal;
   determining the differential group delay in dependence on the indication of the channel transfer function;
   determining a delay between a polarisation mode dispersion compensated first digitised signal and a polarisation mode dispersion compensated second digitised signal;
   subtracting the delay from the differential group delay to obtain a corrected differential group delay; and
   generating and transmitting a monitoring signal comprising an indication of the corrected differential group delay.

18. The non-transitory computer-readable storage medium as claimed in claim 17, wherein the first and second digitised signals are received at a digital signal processor comprising a two-dimensional matched filter and the indication of the channel transfer function is obtained from the two-dimensional matched filter.

19. The non-transitory computer-readable storage medium as claimed in claim 17, wherein the polarisation mode dispersion compensated first and second digitised signals are received at a synchroniser arranged to synchronise the digitised signals, and the delay between the digitised signals is determined at the synchroniser, and the instructions, if executed by the processor, will cause the processor to further perform operations comprising extracting the delay from the synchroniser.

20. The non-transitory computer-readable storage medium as claimed in claim 19, wherein the synchroniser comprises a framer and the polarisation mode dispersion compensated first digitised signal is framed by the framer into a first plurality of frames and the polarisation mode dispersion compensated second digitised signal is concurrently framed by the framer into a second plurality of frames, each of the frames having a frame structure comprising a plurality of bytes, and the delay between the digitised signals is determined at the framer by determining a delay between a pre-selected byte of each frame of a concurrent pair of frames, wherein the concurrent pair of frames comprises one frame from each of the pluralities of frames.

21. The non-transitory computer-readable storage medium as claimed in claim 20, wherein the polarisation mode dispersion compensated first digitised signal is split into a plurality of first sub-signals and each first sub-signal is received by a respective lane of the framer, and each first sub-signal is framed by the framer into the first plurality of frames, and wherein the polarisation mode dispersion compensated second digitised signal is split into a plurality second sub-signals and each second sub-signal is received by a respective lane of the framer, and each second sub-signal is framed by the framer into the second plurality of frames, the delay between the digitised signals being determined at the framer by inspecting a pre-selected byte of a frame of the first sub-signal and the pre-selected byte of a concurrent frame of the second sub-signal.

22. The non-transitory computer-readable storage medium as claimed in claim 20, wherein the pre-selected byte comprises an indication of the polarisation of the respective signal.

23. The non-transitory computer-readable storage medium as claimed in claim 21, wherein the sub-signals are mapped into their respective lanes in dependence on their polarisation and the delay between the digitised signals is determined at the framer by inspecting the pre-selected byte of a frame in a first lane corresponding to the first polarisation and the pre-selected byte of a concurrent frame of a frame in a second lane corresponding to the second polarisation.

24. The non-transitory computer-readable storage medium as claimed in claim 17, wherein the instructions to cause the processor to perform applying a polarisation mode dispersion compensation comprises instructions to cause the processor to perform applying one of a positive polarisation mode dispersion, a negative polarisation mode dispersion, and zero polarisation mode dispersion.

* * * * *